INVENTORS
WOLFGANG E. MEYER
RAFAEL H. BRAND

United States Patent Office 2,735,413
Patented Feb. 21, 1956

2,735,413

INTERNAL-COMBUSTION ENGINES

Wolfgang E. Meyer, State College, Pa., and Rafael H. Brand, Waynesboro, Va., assignors, by mesne assignments, to The Texas Company, New York, N. Y., a corporation of Delaware Application December 5, 1952, Serial No. 324,286

4 Claims. (Cl. 123—32)

This invention relates to combustion chambers for internal combustion engines of the reciprocating piston type wherein swirling motion of the air charge within the combustion chamber is produced by the compression stroke of the engine reciprocating piston.

The present invention involves an improved combustion chamber which is particularly suitable for use with an internal combustion engine of the type disclosed in the copending application of Charles F. Taylor, Serial No. 175,801, filed July 25, 1950. That application discloses a 2-stroke engine operating with focal scavenging in the main cylinder space, compression swirling of the air charge in an auxiliary combustion chamber, and combustion induced by spark or other positive ignition means as distinguished from compression ignition, and in its preferred embodiment involves such an engine wherein combustion is independent of the spontaneous ignition quality of the fuel employed and knocking is prevented.

It is an object of the present invention to provide an improved combustion chamber for an engine of the aforesaid type.

It is another object of this invention to provide a combustion chamber for an engine of the aforesaid type enabling improved combustion efficiency.

Another object is to provide a combustion chamber which enables operation of an engine of the aforesaid type at part load with improved fuel economy.

Another object is to provide an improved combustion chamber for an engine of the aforesaid type having substantially constant air flow velocity throughout the cross section of the air swirling path.

Other objects and advantages of the present invention will be apparent from the following description when taken in conjunction with the attached drawing and the appended claims.

In the type of engine to which the combustion chamber of the present invention is particularly suitable, each cylinder is provided with a reciprocating piston operating in the main cylinder space with only mechanical clearance with the cylinder head at its upper dead center position, and an auxiliary combustion chamber mounted on top of the cylinder and connected to the main cylinder space by a transfer passage which opens into the auxiliary combustion chamber tangentially of an inscribed circle of the latter, whereby movement of the piston on the compression stroke imparts to the charge of air or other equivalent fuel oxidizing agent a high velocity compression swirl about an axis in the combustion chamber, of the order of 4–12 rotations per engine revolution. The said auxiliary combustion chamber is provided with fuel injection means for injecting fuel into the rapidly rotating compressed air therein during the latter part of the piston compression stroke, and has positive ignition means for positively igniting the resulting combustible fuel vapor air mixture formed therein.

The invention is more particularly illustrated in the drawings which disclose a preferred embodiment thereof wherein.

Figure 1:
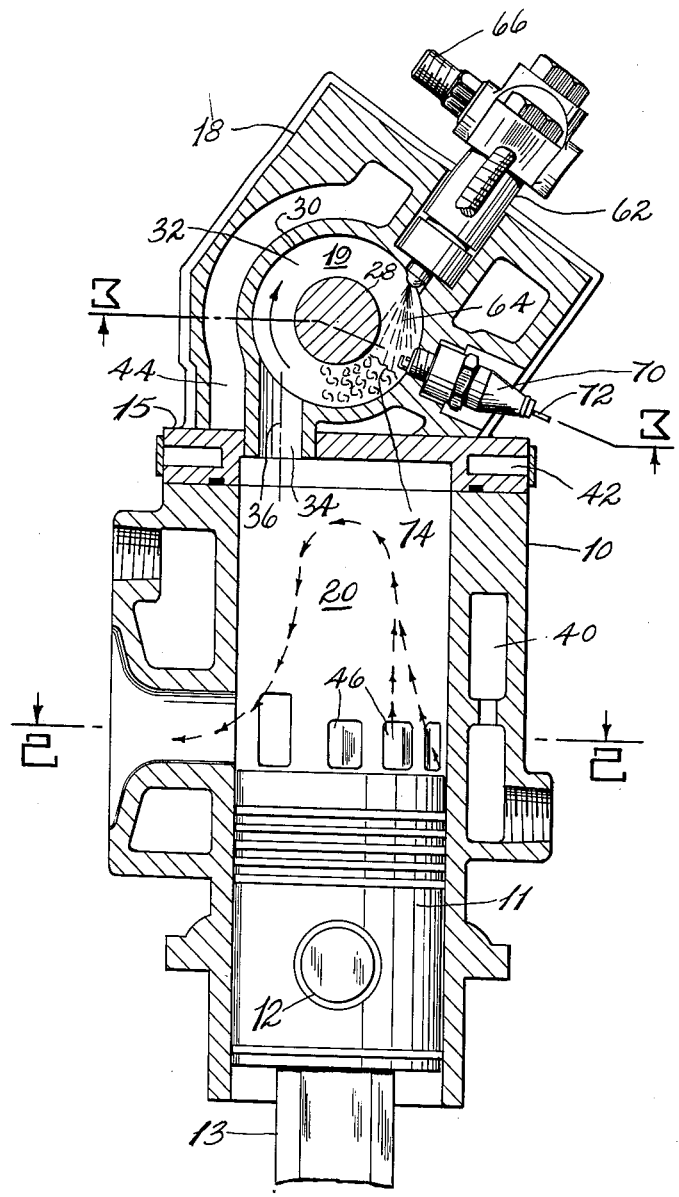
Fig. 1 is a vertical sectional view, taken on the plane of line 1—1 of Fig. 2, of an engine and combustion chamber constructed in accordance with the present invention.
Figure 3:
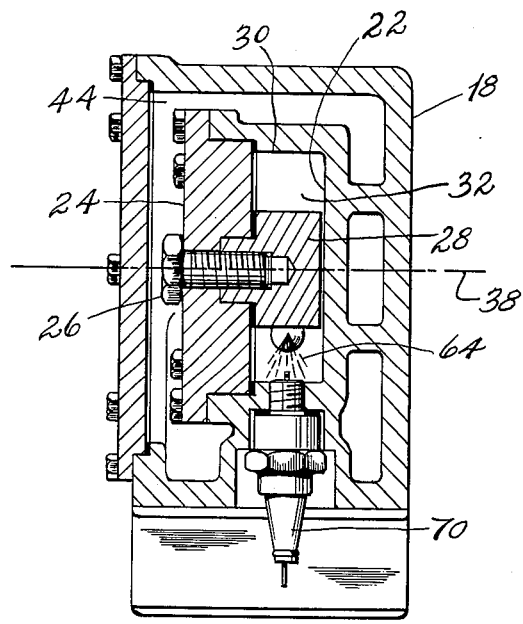
Fig. 3 is an enlarged sectional view of the combustion chamber shown in Fig. 1, said view being taken on the plane of the line 3—3 of Fig. 1.
Figure 2:
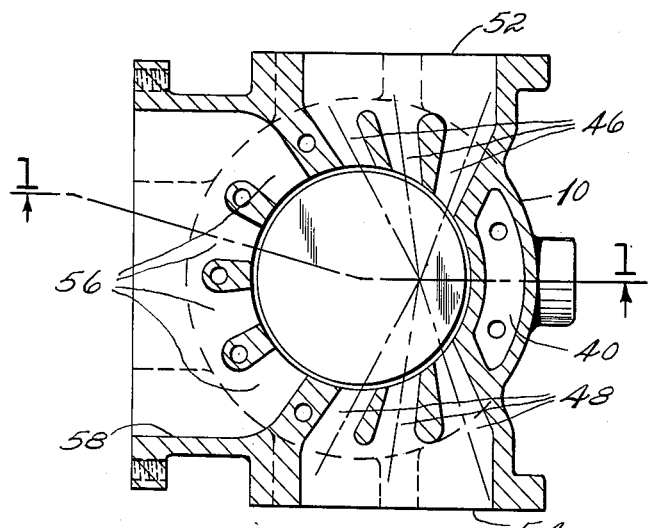
Fig. 2 is a horizontal sectional view on the plane of the line 2—2 of Fig. 1.

Referring to Figs. 1–3, there is shown an engine having a cylinder 10, with a reciprocating piston 11, wrist pin 12 and connecting rod 13 running to the usual crank shaft, not shown. Fastened to the upper end of cylinder 10 is a cylinder head 15, the lower surface of which has only mechanical clearance with the top of piston 11 when the latter is in upper dead center position.

Mounted on cylinder head 15 is a casting 18 formed with an auxiliary combustion space 19 of cylindrical outline, the diameter of which is preferably somewhat less than the diameter of the main cylinder space 20 of cylinder 10. In the construction shown, the casting 18 is formed with one integral flattened end 22 for space 19, and the opposite end is closed by a removable cover plate 24, thereby providing a comparatively thin discshaped space having a thickness between the opposed flattened side walls 22 and 24 which is very much less than the diameter of the space 19. Supported from plate 24 by a bolt 26 concentrically within the space 19 is a cylindrical plug 28 which, by occupying the centermost portion of the space 19, coacts with its outer cylindrical wall 30 to define an auxiliary combustion chamber 32 of annular shape, which is disposed coaxially with space 19 and has a rectangular cross section taken in a plane through the axis of revolution of a plane surface which, when revolved thereabout, will generate the volume of the annular-shaped auxiliary combustion chamber.

The annular combustion chamber 32 is connected with the main cylinder space 20 by a transfer passage 34 of comparatively small cross-sectional area, the centerline 36 of which is tangent to an inscribed circle of space 19. Consequently, on the compression stroke of piston 11, air which is compressed in main cylinder space 20 is forced through transfer passage 34 into the annular auxiliary combustion chamber 32 in a manner to impart a high velocity swirling movement of the air charge through the annular combustion chamber 32 and about the centerline or axis of revolution 38 of the space 19.

The volume of the annular combustion chamber 32 together with that of the transfer passage 34 bears such a relationship to the displacement volume of the main cylinder space 20 as to give the desired compression ratio of the engine, which as pointed out heretofore is preferably at least 8:1, and generally about 9:1 to 13:1. The cross-sectional area of the transfer passage 34 is coordinated with the off-center positioning or tangency to the inscribed circle of space 19 to provide a compression-induced swirl of the air charge within annular combustion chamber 32 and about axis of revolution 38 at a rate of about 4–12 rotations per engine revolution, and preferably about 8–9 rotations per engine revolution.

Cylinder 10, cylinder head 15 and casting 18 are provided with circulating cooling water passages 40, 42 and 44 respectively. The removable flattened closure plate 24 for space 19 may also be provided with circulating cooling water passages, not shown, which may extend into the cylindrical plug 28, if desired.

As shown in Figs. 1 and 2, cylinder 10 is provided with two opposed series of intake ports 46 and 48 respectively formed in the wall of the cylinder just above the piston 11 when the latter is at the bottom of its power stroke as illustrated in Fig. 1. Ports 46 and 48 communicate with air intake manifolds 52 and 54, respectively, the latter preferably leading to a common source of supply of air under pressure or from a supercharger. Cylinder 10 is also formed with a series of exhaust ports 56 formed through the wall thereof above the bottom position of piston 11 and on the opposite side of the cylinder 10 from the two sets of air inlet ports 46 and 48. Exhaust ports 56 open into an exhaust manifold 58 which is connected to the usual exhaust pipe and muffler, not shown.

As shown in Fig. 1, the exhaust ports 56 extend upwardly in the cylinder wall further than the air inlet ports 46 and 48, so that on the latter part of the power stroke of piston 11 the exhaust ports open first to relieve the pressure in main cylinder space 20. Further downward movement of piston 11 on its power stroke then uncovers the two opposed sets of air inlet ports 46 and 48, with the result that opposed streams of air enter the lower portion of main cylinder space 20 and scavenge combustion products therefrom out through the exhaust ports 56.

Mounted in casting 18 and extending through the outer peripheral wall 30 of annular combustion chamber 32 is a fuel injection nozzle 62 having a spray port directed to discharge a fuel spray 64 into the annular combustion chamber 32. Fuel nozzle 62 is connected at 66 to a suitable injection fuel supply line leading to a fuel pump driven in synchronism with the engine and at engine speed for two-stroke operation.

Also mounted in casting 18 and extending through the periphery of chamber 19 at a point preferably less than 90° of swirling movement from the tip of fuel injection nozzle 62, is a spark plug 70. The spark plug 70 is connected by a lead 72 to a conventional ignition system having a distributor driven in synchronism with the engine in the well-known manner.

The present invention contemplates that the combustion occurring in such auxiliary combustion chamber shall preferably be of the non-knocking type as disclosed in the Barber patent, No. 2,484,009. In such operation of the engine, piston 11 when descending on its power stroke uncovers the exhaust ports 56 about 30° before bottom dead center. The air intake ports 46 and 48 are then uncovered about 20° before bottom dead center, providing focal scavenging for the previous combustion cycle out of the main combustion space 20 through the exhaust ports 56. On the return compression stroke of piston 11 the air intake ports and exhaust ports are closed in sequence, and the air remaining in the main air cylinder space 20 is then compressed, starting a flow of compressed air from main cylinder space 20 through transfer passage 34 tangentially of the annular auxiliary combustion chamber 32 and creating a high velocity swirling motion of the air charge through the annular chamber 32 about the axis 38. About 75-10° before top dead center of the compression stroke, injection of fuel into the swirling air is initiated by nozzle 62. The first increment of injected fuel is positively ignited by spark plug 70 substantially as soon as combustible fuel vapor air mixture has been formed therefrom to establish a flame front 74. While the flame front may tend to travel at higher velocity than that of the swirling air, such normal movement of the flame front 74 is impeded by the air swirl and by encountering excessively rich fuel air mixture as it approaches the fuel nozzle 62, with the result that the flame front 74 remains in essentially a fixed position with reference to the annular combustion chamber 32.

Fuel injection is continued following ignition to develop the power required on each cycle, this continued fuel injection progressively impregnating fresh increments of the swirling air as they move past the nozzle 62, thereby progressively forming additional increments of combustible fuel vapor air mixture which are ignited by the flame front and burned substantially as rapidly as produced. Substantially all of the compressed air is forced from the main cylinder space into the auxiliary combustion chamber and the high velocity swirling movement of the compressed air in said auxiliary combustion chamber is preferably maintained throughout the injection period so that the desired controlled and progressive impregnation of the air with fuel is secured. Consequently, knocking of the engine cannot occur, even at high compression ratios and high charge densities, irrespective of the quality of fuel employed. Injection for full load operation is continued for one complete rotation of the air about the axis 38 of annular combustion chamber 32.

Each increment of swirling air has a linear velocity as it travels through the annular chamber 32 which is generally proportional to the radius of the flow path of that increment. The confinement of the air flow path by plug 28 to a combustion chamber of annular shape eliminates air flow at the centermost portion of the space 19 where its linear velocity, while swirling about axis 38, would be very low. Thus, the annular shape of chamber 32 provides a combustion chamber in which very low velocities of air flow are eliminated, with the result that variation between extremes of linear flow velocity at inner and outer sides of a cross section of chamber 32 is greatly reduced. This means that all of the flowing air increments across which the flame front 74 is maintained are moving at substantially the same linear velocity which contributes to a more orderly, uniform, and efficient combustion than has heretofore been possible, enabling the achievement of improved combustion efficiencies, and improved fuel economy at overall fuel air ratios corresponding to part load operation.

The annular shape of the chamber 32 also has an increased ability to sustain the substantial momentum of the air swirl therein created by the compression stroke of piston 11. This factor, together with the improved orderliness of the flame front 74 across the annular combustion chamber, reduces disturbance of the air swirl therein during combustion and prolongs the orderly movement of the swirling air during the latter portion of the combustion period when the piston 11 has begun its expansion stroke.

The annular shape of the combustion chamber therefore substantially improves the quality and duration of the swirling air motion during the important combustion period. This improved ability of the annular combustion chamber to prolong the orderly movement of the swirling air enables transfer passage 34 to be larger in cross-sectional area than might otherwise be possible, without incurring a premature reversal of the air flow in the auxiliary combustion chamber by expansion of initial combustion products from chamber 32 through the transfer passage 34 into the main cylinder space before the piston 11 has finished its compression stroke. The increased size of the transfer passage 34 which is thus made possible is desirable in enabling improved scavenging of combustion products from the auxiliary combustion chamber.

While the annular combustion chamber shown in the drawings has a rectangular cross section in a plane through the axis of revolution of a plane surface which generates the volume of the combustion chamber when revolved about this axis and has peripheral walls of cylindrical shape, it should be understood that the cross section of the auxiliary combustion chamber in a plane through the axis of revolution of the plane surface which generates the volume of the combustion chamber may be any desired configuration such as circular, elliptical, and the like, and the peripheral walls may be other than cylindrical so long as they define a closed annular air flow path. Also the inner peripheral wall need not be concentric with the outer peripheral wall, but the two may, if desired, be centered on different axes.

Thus there has been shown and described an improved combustion chamber of annular shape for use with an internal combustion engine employing swirling movement of air charge produced by a piston compression stroke, which combustion chamber provides improved quality and duration of air swirling movement together with a swirling air flow path which enables the maintenance of a more constant air velocity distribution thereacross and a more orderly flame front therein, with resultant improved combustion efficiency and improved part load fuel economy.

Obviously, many modifications and variations of the invention, as hereinbefore set forth, may be made without departing from the spirit and scope thereof and therefore only such limitations should be imposed as are indicated in the appended claims.

We claim:

1. An internal combustion engine of the reciprocating piston type comprising, in combination, a cylinder with piston therein providing a main cylinder space, a head having only mechanical clearance with the piston in upper dead center position, said head containing an auxiliary combustion chamber of annular shape generated by a plane surface revolved about a predetermined axis, a transfer passage connecting said auxiliary combustion chamber to said main cylinder space and disposed tangentially to an inscribed circle within said combustion chamber for directing air through said combustion chamber in a high velocity swirl about said axis responsive to a compression stroke of said piston, said transfer passage intercepting said auxiliary combustion chamber well within the diametral limits of internal tangency and together therewith having a volume relative to the volume of said main cylinder space providing a compression ratio in excess of 8:1, means for scavenging said main cylinder space, and fuel injection and positive ignition means for effecting a flame-front type of combustion in the annular combustion chamber with said flame front oriented in a cross section of said annular chamber taken in a plane through said axis, said cross section being such that all of the flowing air increments across which said flame front type of combustion is maintained are moving at substantially the same linear velocity whereby better combustion control is obtained.

2. An internal combustion engine of the reciprocating piston type having a cylinder with piston therein providing a main cylinder space, a head having only mechanical clearance with said piston in upper dead center position, a combustion chamber in said head having the shape of an annulus generated by a plane surface revolved about a predetermined axis, a transfer passage connecting said main cylinder space to said combustion chamber and disposed substantially within the limits of internal tangency to said combustion chamber for producing a swirl of an air charge in said combustion chamber about said axis at from 4–12 rotations per engine revolution responsive to a compression stroke of said piston, means for injecting fuel into the swirling air charge within said combustion chamber, and positive ignition means for igniting fuel air mixture for effecting a flame front type of combustion therein, the cross section of said combustion chamber being such that all air increments flowing thereacross will move at substantially the same linear velocity, said cross section being taken in a plane through said axis.

3. An internal combustion engine of the reciprocating piston type comprising, in combination, a cylinder with piston therein providing a main cylinder space, a head having only mechanical clearance with said piston in upper dead center position, an auxiliary combustion chamber of annular shape adjacent said main cylinder space defined by a geometrical figure spinning on a predetermined axis, a transfer passage connecting said auxiliary combustion chamber to said main cylinder space and disposed tangentially to an inscribed circle within the annular combustion chamber for directing air through said annular combustion chamber in a high velocity swirl about said axis responsive to a compression stroke of said piston, said transfer passage entering the peripheral wall of said chamber considerably within the limit of internal tangency and with said auxiliary combustion chamber together having a volume relative to the volume of said main cylinder space providing a compression ratio in excess of 8:1, means for scavenging said main cylinder space, and fuel injection and positive ignition means for effecting a flame-front type of combustion in said annular combustion chamber with said flame front oriented in a cross section of said annular chamber taken in a plane through said axis, said combustion chamber having a cross sectional area such that all portions of the air flow therethrough will move at substantially the same linear velocity.

4. An internal combustion engine of the reciprocating piston type having a cylinder with piston therein providing a main cylinder space, a head having only mechanical clearance with said piston in upper dead center position, a combustion chamber adjacent said main cylinder space having the shape of an annulus defined by a geometrical figure revolved about a predetermined axis, a transfer passage connecting said main cylinder space to said combustion chamber and intersecting the peripheral wall thereof within the limit of internal tangency so that the center line of said passage is tangent to a circle inscribed in said combustion chamber for producing a swirl of an air charge in said combustion chamber about said axis at from 4–12 rotations per engine revolution responsive to a compression stroke of said piston, means for injecting fuel into said swirling air charge within said combustion chamber and positive ignition means for igniting fuel air mixture for effecting a flame front type of combustion therein, said combustion chamber having dimensions so that all increments of air flowing across the cross section thereof move at substantially the same linear velocity, said cross section being taken in a plane through said axis.

References Cited in the file of this patent

UNITED STATES PATENTS

| 746,840 | Hurd | Dec. 15, 1903 |
| 1,324,406 | Ohlsson | Dec. 9, 1919 |
| 1,835,490 | Hesselman | Dec. 8, 1931 |
| 2,043,080 | Vincent | June 2, 1936 |

FOREIGN PATENTS

| 802,571 | France | Sept. 8, 1936 |
| 864,561 | France | Jan. 21, 1941 |